(12) United States Patent
Haeuser

(10) Patent No.: US 10,555,593 B1
(45) Date of Patent: Feb. 11, 2020

(54) LIP APPLICATOR CARRIER SYSTEM

(71) Applicant: Russell Randall Haeuser, West Bend, WI (US)

(72) Inventor: Russell Randall Haeuser, West Bend, WI (US)

( * ) Notice: Subject to any disclaimer, the term of this patent is extended or adjusted under 35 U.S.C. 154(b) by 229 days.

(21) Appl. No.: 15/495,244

(22) Filed: Apr. 24, 2017

Related U.S. Application Data

(60) Provisional application No. 62/326,172, filed on Apr. 22, 2016.

(51) Int. Cl.
*A45C 11/00* (2006.01)
*A45D 40/00* (2006.01)

(52) U.S. Cl.
CPC ...... *A45D 40/00* (2013.01); *A45D 2040/0006* (2013.01)

(58) Field of Classification Search
CPC .................................................. A45C 11/008
USPC ................................ 401/16, 18, 19, 20, 131
See application file for complete search history.

(56) References Cited

U.S. PATENT DOCUMENTS 5,836,055 A * 11/1998 Cooper .................. A45D 40/00
24/339
2003/0168377 A1* 9/2003 Gorvett .................. A45D 40/24
206/581

\* cited by examiner

*Primary Examiner* — David J Walczak
*Assistant Examiner* — Joshua R Wiljanen
(74) *Attorney, Agent, or Firm* — Shane Cortesi

(57) ABSTRACT

A lip applicator carrier system includes a carrier that has a housing, a plurality of reservoirs that receive lip balm or another lip applicator, and a clip to attach the carrier to a vehicle visor. The reservoirs may be c-shaped with an open bottom to allow placement of the lip balm via a press fit/snap fit.

17 Claims, 4 Drawing Sheets and filed Apr. 22, 2016, the contents of which are incorporated herein by reference in their entirety.

LIP APPLICATOR CARRIER SYSTEM

RELATED APPLICATIONS

This application claims priority under 35 USC 119 to U.S. Provisional Application No. 62/326,172, entitled Stick Clip and filed Apr. 22, 2016, the contents of which are incorporated herein by reference in their entirety.

BACKGROUND

Technical Field

The present invention relates to carriers for lip applicators such as lip balm and cosmetic lip stick.

Background of the Invention

Lip balm is commonly used to prevent chapped lips, and other purposes.

The most common type of lip balm is sold under the name CHAPSTICK (Wyeth, LLC, New York, N.Y.), and generally includes a cylindrical housing with an interior comprising the lip balm, a removable cap, and a dispensing means in the form of a twistable knob to remove the lip balm out of the housing.

Users frequently use lip balm, as well as cosmetic lipstick, in their car.

Driving, however, is an inherently dangerous activity that becomes more dangerous if the driver become distracted. One way drivers become distracted is by dropping or otherwise being unable to locate items with the vehicle. For example, lip balm can easily fall behind their seat or remain hidden within a purse or pocket and searching for the lip balm causes the driver to become distracted. Additionally, people are constantly losing or misplacing lip balm, which can be wasteful. Therefore, when in their car, many people store lip balm in their center console, but this area can quickly become cluttered and messy.

Thus, there is a need for a carrier that is configured to store lip balm, lip stick and other lip applicators for use in the car.

BRIEF SUMMARY

The present disclosure relates to a lip applicator carrier systems as described herein.

In some embodiments, the present disclosure provides a lip applicator carrier system comprising: a) at least one lip applicator comprising a lip applicator housing, a lip applicator housing interior, and a dermatologically acceptable topical agent located in the lip applicator housing interior and configured to be used on a human's lips; and b) a carrier comprising a carrier housing comprising a top, a forward end, a rear end opposite the forward end, a left side, a right side opposite the left side, a substantially open bottom, at least one internal wall extending downward from the carrier housing top and defining a plurality of reservoirs.

Optionally, each of the plurality of reservoirs extend from the carrier housing forward end to the carrier housing rear end. Optionally, the carrier further comprises a clip extending above (and preferably attached to) the carrier housing top. Optionally, the at least one lip applicator is removably located in a reservoir. Optionally, the at least one internal wall comprises a bottom portion curving radially inward and further wherein the left side and right side of the housing comprise a bottom portion curving radially inward so that the plurality of reservoirs are generally c-shaped with a substantially open bottom (preferably a fully open bottom). Optionally, the plurality of reservoirs are generally c-shaped with a substantially open bottom and the at least one lip applicator is press fit into the reservoir. Optionally, the forward end and rear end of the carrier housing are substantially open (e.g., fully open except for the internal wall(s)). Optionally, the top of the carrier housing is generally flat. Optionally, the clip comprises a deflectable free rear end not attached to the carrier housing and further wherein the deflectable free rear end is configured to move away from the top of the carrier housing to allow a visor of a vehicle to be placed between the deflectable free rear end and the top of the carrier housing. Optionally, the clip is removably attached to a visor of a vehicle. Optionally, the clip comprises a generally c-shaped segment comprising a curve pointing generally in the forward direction. Optionally, the generally c-shaped segment of the clip is located adjacent the forward end of the housing. Optionally, the plurality of reservoirs are substantially the same size and have a diameter of from about 0.5 inches to about 0.75 inches. Optionally, the lip applicator housing is generally cylindrical in shape. Optionally, the dermatologically acceptable topical agent is lipstick. Optionally, the dermatologically acceptable topical agent is lip balm. Optionally, the lip applicator further comprises a removable cap configured to prevent exposure of the dermatologically acceptable topical agent to the environment. Optionally, each reservoir comprises a top and further wherein at least one reservoir comprises a deflectable ramp extending from the top of the reservoir.

In still further embodiments, the present disclosure provides a method of loading a lip applicator carrier system comprising steps of: a) providing at least one lip applicator as described above; b) providing a carrier as described above; c) loading the at least one lip applicator into a reservoir; and d) attaching the clip to a substrate.

Optionally, the plurality of reservoirs are generally c-shaped with a substantially open bottom and step d) comprises press fitting the at least one lip applicator into the reservoir. Optionally, the at least one internal wall comprises a bottom portion curving radially inward and further wherein the left side and right side of the housing comprise a bottom portion curving radially inward so that the plurality of reservoirs are generally c-shaped with a substantially open bottom and step d) comprises deflecting at least one of i) the bottom portion of the internal wall; ii) the bottom portion of the left side of the housing; and iii) the bottom portion of the right side of the housing, while press fitting the at least one lip applicator into the reservoir. Optionally, the clip comprises a deflectable free rear end not attached to the carrier housing, wherein the deflectable free rear end is configured to move away from the top of the carrier housing to allow a visor of a vehicle to be placed between the deflectable free rear end and the top of the carrier housing, and further wherein step d) comprises removably attaching the clip to a visor a vehicle by the positioning the visor between the deflectable rear end and the top of the carrier housing. Optionally, the method further comprises removing the at least one lip applicator from the reservoir and applying the dermatologically acceptable topical agent to a human's lips.

In still further embodiments, the present disclosure provides a single reservoir design and includes: a) a single lip applicator comprising a lip applicator housing, a lip applicator housing interior, and a dermatologically acceptable topical agent located in the lip applicator housing interior and configured to be used on a human's lips; and b) a carrier comprising a carrier housing comprising a top, a forward end, a rear end opposite the forward end, a left side, a right side opposite the left side, a substantially open bottom, and a single reservoir. The single reservoir design may include one or more features described above, including without limitation, the clip and the curved bottom portion of the left side and right side of the housing.

BRIEF DESCRIPTION OF THE DRAWINGS

in FIG. 6, lip balm is positioned in the reservoirs of the carrier.

DETAILED DESCRIPTION

Figure 1:
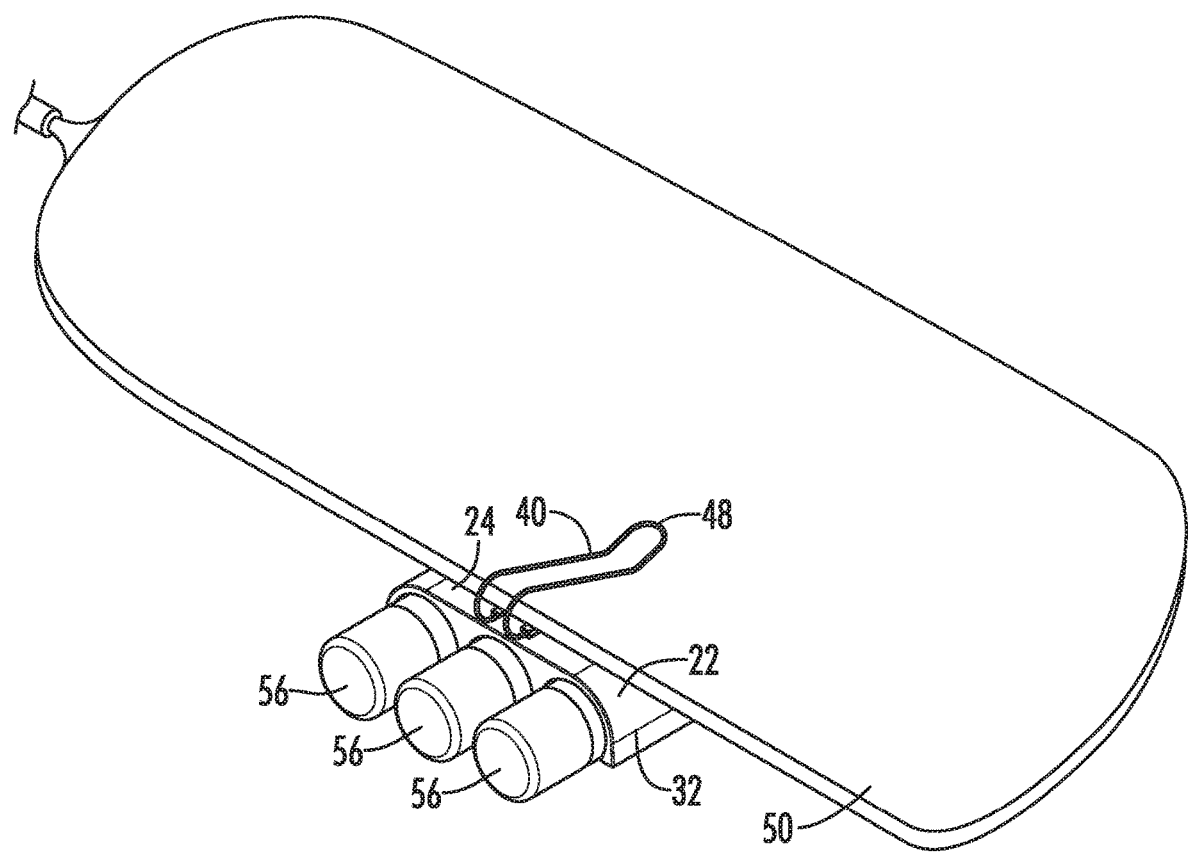
FIG. 1 illustrates a top perspective view of one embodiment of the lip applicator carrier system of the present invention attached to a vehicle visor.
Figure 2:
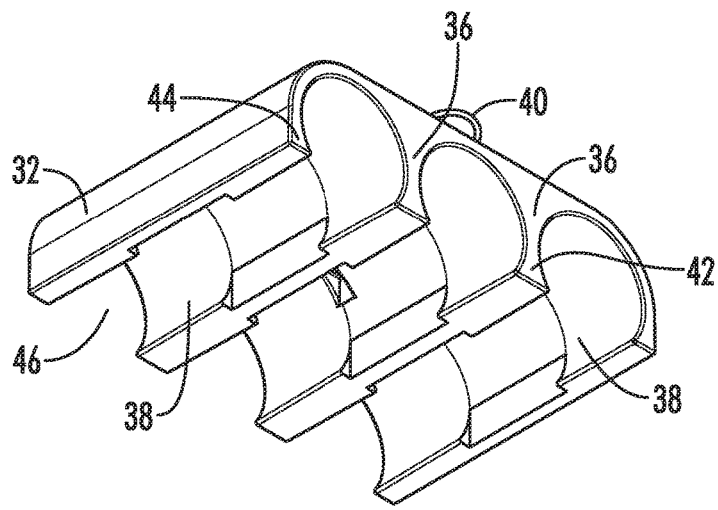
FIG. 2 illustrates a bottom perspective view of the carrier of the lip applicator carrier system of FIG. 1.

With reference to FIGS. 1-9, the present invention provides a lip applicator carrier system designated by the numeral 10. In the drawings, not all reference numbers are included in each drawing for the sake of clarity. It will be appreciated that the drawings are CAD drawings drawn to scale, however, other dimensions are possible.

Referring further to FIGS. 1-9, the lip applicator carrier system 10 may include at least one lip applicator 12 comprising a lip applicator housing 14, a lip applicator housing interior 16, and a dermatologically acceptable topical agent 18 located in the lip applicator housing interior 16 and configured to be used on a human's lips. The lip applicator 12 may be any lip applicator now used or later developed. In some embodiments, the lip applicator 12 is in the form of lip balm or lipstick. Optionally, the lip applicator 12 may include a twistable ring at the rear end to facilitate dispensing of the dermatologically acceptable topical agent 18. The lip applicator 12 may also include a removable cap 56.

Figure 6:
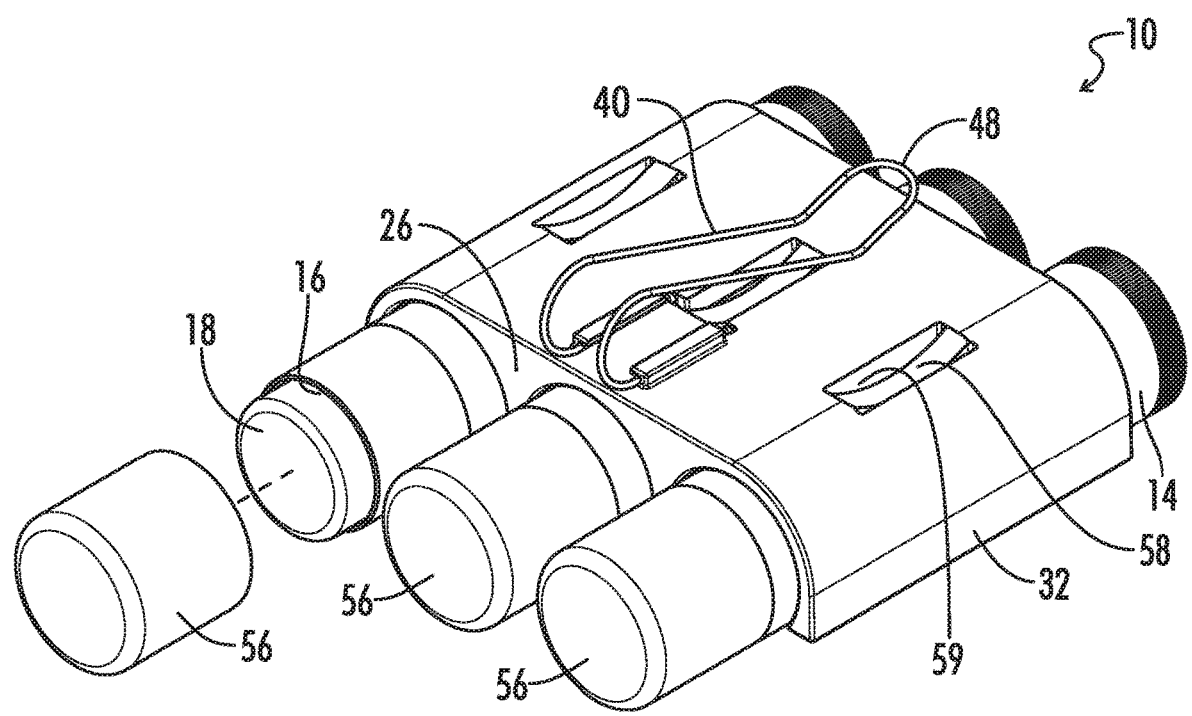
FIG. 6 illustrates a front perspective view of the carrier of the lip applicator carrier system of FIG. 1.
Figure 7:
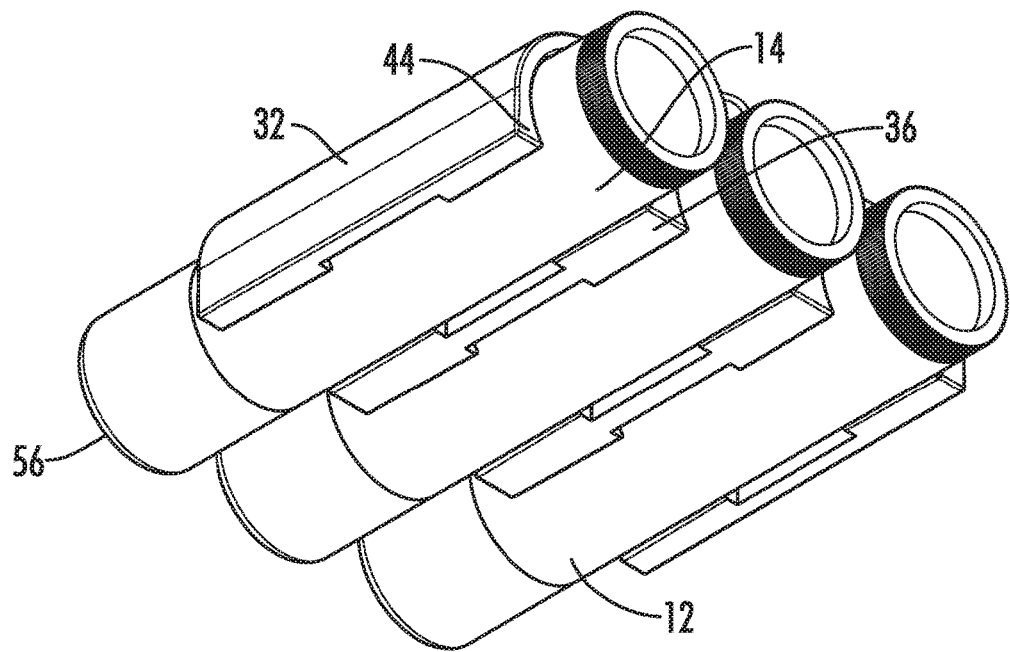
FIG. 7 illustrates a bottom perspective view of the carrier and lip balm of FIG. 1.

The lip applicator carrier system 10 may also include a carrier 20 comprising a carrier housing 22 comprising a top 24, a forward end 26, a rear end 28 opposite the forward end 26, a left side 30, a right side 32 opposite the left side 30, a substantially open bottom 46, at least one internal wall 36 extending downward from the carrier housing top 24 and defining a plurality of reservoirs 38, which are located below the carrier housing top 24. Optionally, each of the plurality of reservoirs 38 extend from the carrier housing forward end 26 to the carrier housing rear end 28 to allow the lip applicator 12 to fully extend through the carrier 20, as best seen in FIGS. 6 and 7. In the embodiment of FIGS. 1-9, the housing 22 has three reservoirs 38. In other embodiments, the housing 22 may include only one reservoir 38, in which case the internal wall 36 is not needed; however, in all other aspects, the single reservoir design may be similar to the triple reservoir design shown in FIGS. 1-9.

Optionally, the carrier 20 further comprises a clip 40 extending above (and preferably attached to) the carrier housing top 24. The clip 40 may be a separate part (e.g., a wire) joined to the housing 22 or the clip 40 may be integral with the carrier housing 22 (e.g., the housing 22 and the clip 40 may be a single piece of plastic). As used herein, the term "attached" refers to parts that are joined as well as integral parts.

Optionally, the at least one lip applicator 12 is removably located in a reservoir 38, as shown in FIGS. 1, 6, and 7.

Figure 3:
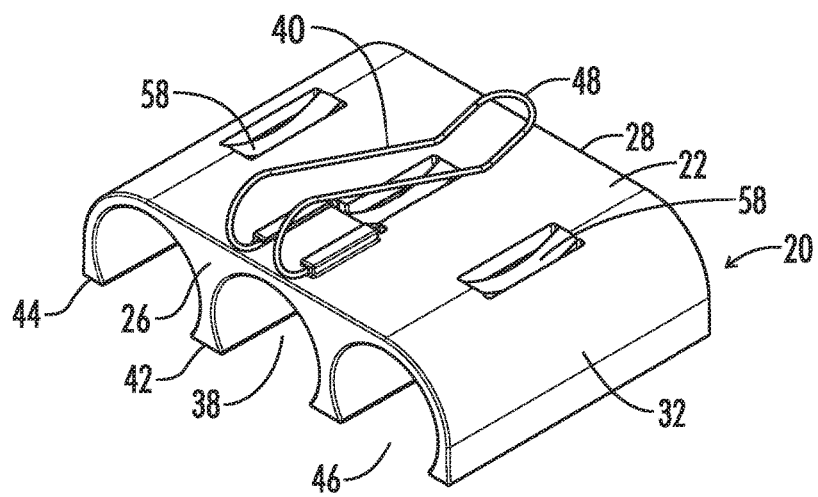
FIG. 3 illustrates a top perspective view of the carrier of the lip applicator carrier system of FIG. 1.
Figure 4:
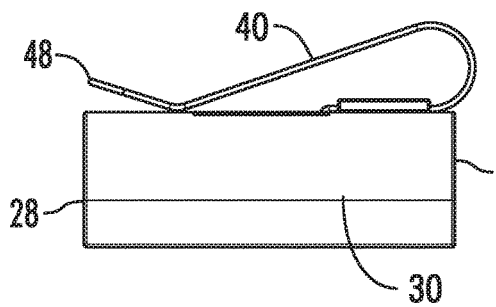
FIG. 4 illustrates a side elevation view of the carrier of the lip applicator carrier system of FIG. 1.
Figure 5:
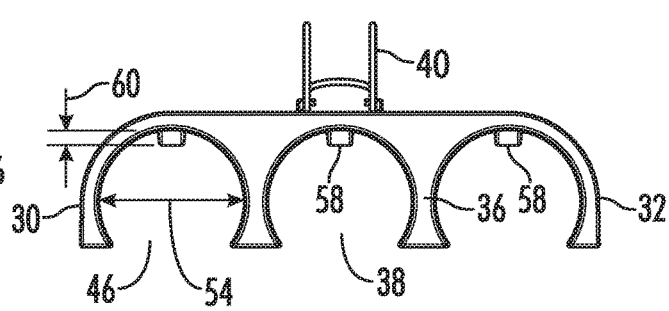
FIG. 5 illustrates a front elevation view of the carrier of the lip applicator carrier system of FIG. 1.
Figure 8:
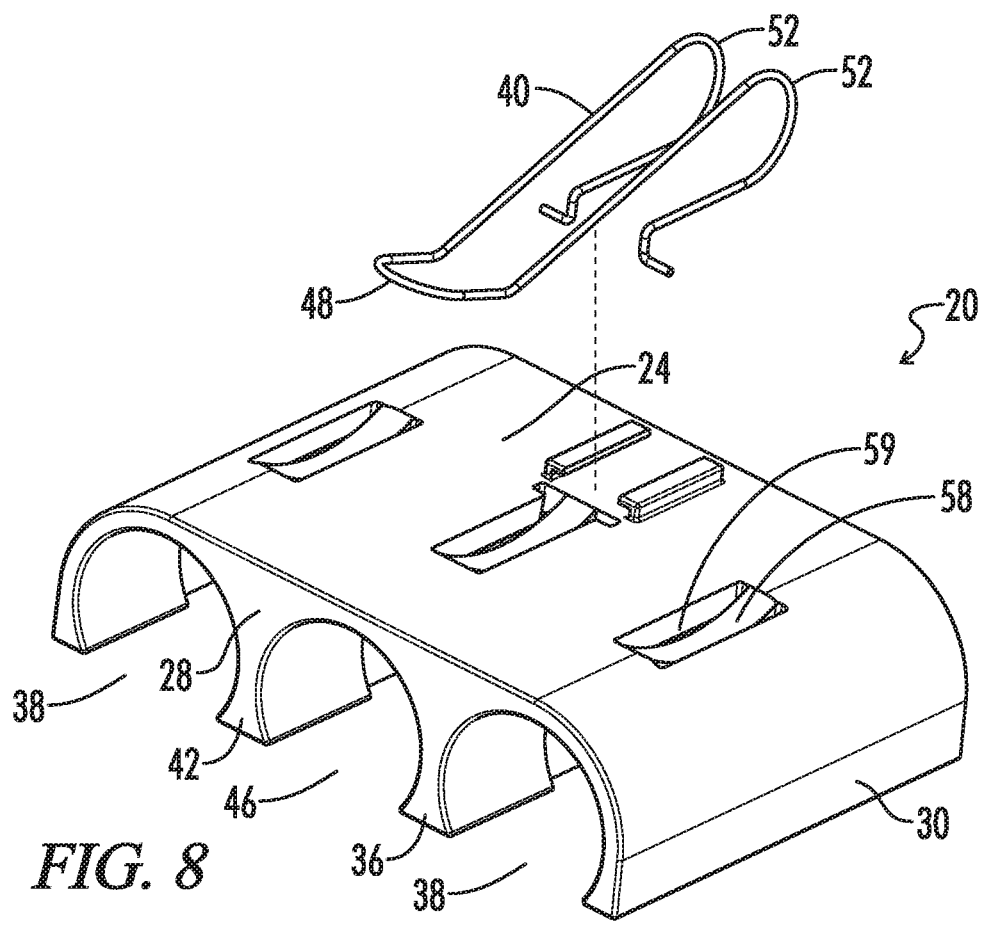
FIG. 8 illustrates a rear, exploded view of the carrier of the lip applicator carrier system of FIG. 1.
Figure 9:
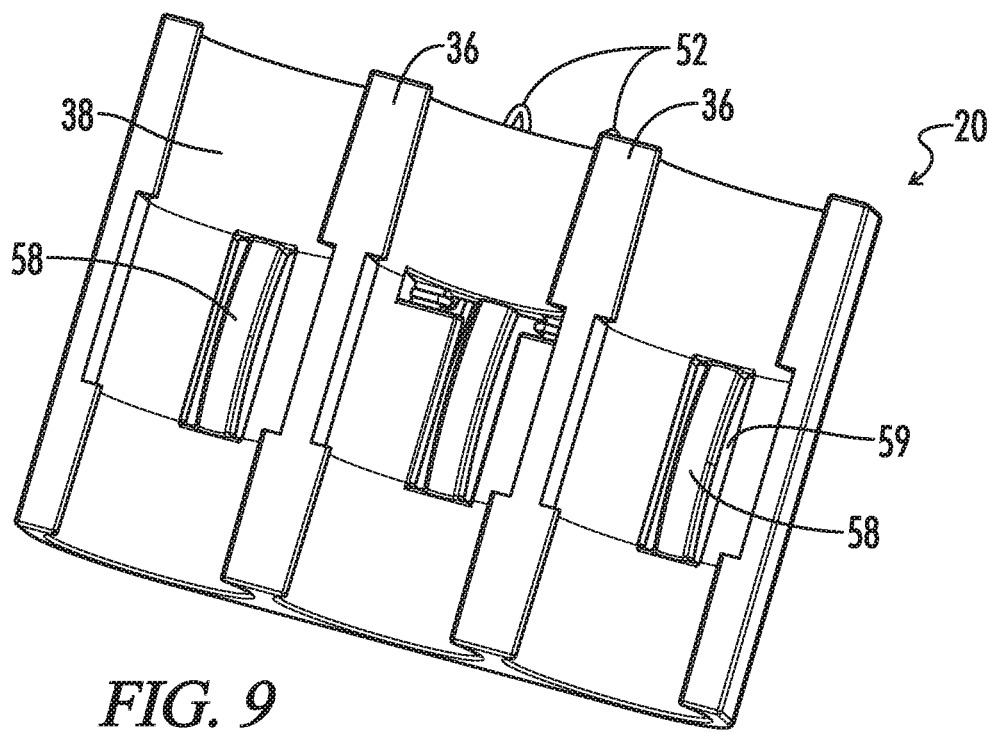
FIG. 9 illustrates a bottom perspective view of the carrier of the lip applicator carrier system of FIG. 1.

Optionally, the at least one internal wall 36 comprises a bottom portion 42 curving radially inward (around the reservoirs 38) and further wherein the left side 30 and right side 32 of the housing 22 comprise a bottom portion 44 curving radially inward (around the reservoirs 38) so that the plurality of reservoirs 38 are generally c-shaped with a substantially open bottom 46 (and with the apex of the reservoir 38 at the top), as best seen in FIGS. 3, 5 and 8 so that the at least one lip applicator 12 is press fit/snap fit into the reservoir 38. In other words, the bottom portion of the internal wall 42 and the bottom portion of the housing 44 partially curves around the lip applicator 12, as best seen in FIG. 7. Preferably, the reservoirs are partial cylinders.

Optionally, the forward end 26 and rear end 28 of the carrier housing 22 are substantially open. Optionally, the top 24 of the carrier housing 22 is generally flat. Optionally, the clip 40 comprises a deflectable free rear end 48 not attached to the carrier housing 22 and further wherein the deflectable free rear end 48 is configured to move away from the top 24 of the carrier housing 22 to allow a visor 50 of a vehicle to be placed between the deflectable free rear end 48 and the top 24 of the carrier housing 22. Optionally, the clip 40 is removably attached to a visor 50 of a vehicle. Optionally, the clip 40 comprises a generally c-shaped segment 52 comprising a curve/apex pointing generally in the forward direction. Optionally, the generally c-shaped segment 52 of the clip 40 is located adjacent the forward end of the housing 26. (e.g, within about 1 inch of the forward end of the housing 26). Optionally, the plurality of reservoirs 38 are substantially the same size and have a diameter 54 of from about 0.5 inches to about 0.75 inches. However, other dimensions are possible.

Optionally, the lip applicator housing 14 is generally cylindrical in shape. Optionally, the dermatologically acceptable topical agent 18 is lipstick. Optionally, the dermatologically acceptable topical agent 18 is lip balm. Optionally, the lip applicator 12 further comprises a removable cap 56 configured to prevent exposure of the dermatologically acceptable topical agent 18 to the environment.

Optionally, each reservoir 38 comprises a top and at least one reservoir 38 (preferably all reservoirs 38) comprises a deflectable ramp 58 extending from the top of the reservoir 38, as best seen in FIGS. 3, 5, 6, 8, and 9. Optionally, each ramp 58 is in the form of an arc-shaped flap that slopes downwardly into the reservoir 38 and is separated from the rest of the housing 22 by two gaps 59 on the left and right side of the ramp 58, as best seen in FIGS. 3, 6, 8, and 9. The purpose of the ramp 58 is to allow for the same carrier 20 to be used with lip applicators 12 of different diameters. With smaller diameter lip applicators 12, the ramp 58 extends the furthest downward into the reservoir 38. By contrast with larger diameter lip applicators 12, the ramp 58 extends less downwardly into the reservoir 38 and is instead deflected by the lip applicator 12. In an exemplary embodiment, the ramp 58 has a height 60 of between about 0.05 inches to about 0.1 inches in the resting/non-deflected state, as shown in FIG. 5. However, such dimensions are merely exemplary.

The lip applicator carrier system 10 may be used in a method of loading a lip applicator carrier system 10 comprising steps of: a) providing the at least one lip applicator 12; b) providing the carrier 20; c) loading the at least one lip applicator 12 (e.g., through the substantially closed bottom 44 or through the forward end 26) and into a reservoir 38; and d) attaching the clip 40 to a substrate.

Optionally, the plurality of reservoirs 38 are generally c-shaped with a substantially open bottom 46 and step d) comprises press fitting the at least one lip applicator 12 into the reservoir 38. Optionally, the at least one internal wall 36 comprises a bottom portion 42 curving radially inward and further wherein the left side 30 and right side 32 of the housing 22 comprise a bottom portion 44 curving radially inward so that the plurality of reservoirs 38 are generally c-shaped with a substantially open bottom 46 and step d) comprises deflecting at least one bottom portion 42 or 44 while press fitting the at least one lip applicator 12 into the reservoir 38. Optionally, the clip 40 comprises a deflectable free rear end 48 not attached to the carrier housing 22, wherein the deflectable free rear end 48 is configured to move away from the top 24 of the carrier housing 22 to allow a visor 50 of a vehicle to be placed between the deflectable free rear end 48 and the top 24 of the carrier housing 22, and further wherein step d) comprises attaching the clip 40 to a visor of a vehicle 50 by the positioning of the visor 50 between the deflectable rear end 48 and the top 24 of the carrier housing 22. Optionally, the method further comprises removing the at least one lip applicator 12 from the reservoir 38 and applying the dermatologically acceptable topical agent 18 to a human's lips.

Having now described the invention in accordance with the requirements of the patent statutes, those skilled in the art will understand how to make changes and modifications to the disclosed embodiments to meet their specific requirements or conditions. Changes and modifications may be made without departing from the scope and spirit of the invention. In addition, the steps of any method described herein may be performed in any suitable order and steps may be performed simultaneously if needed.

Terms of degree such as "generally", "substantially", "about" and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

| Part List | |
|---|---|
| Lip applicator carrier system | 10 |
| Lip applicator | 12 |
| Lip applicator housing | 14 |
| lip applicator housing interior | 16 |
| topical agent | 18 |
| carrier | 20 |
| carrier housing | 22 |
| carrier housing top | 24 |
| carrier housing forward end | 26 |
| carrier housing rear end | 28 |
| carrier housing left side | 30 |
| carrier housing right side | 32 |
| carrier housing internal wall | 36 |
| reservoirs | 38 |
| clip | 40 |
| internal wall bottom portion | 42 |

-continued

| Part List | |
|---|---|
| housing bottom portion | 44 |
| reservoir substantially open bottom | 46 |
| clip deflectable rear end | 48 |
| vehicle visor | 50 |
| clip c-shaped segment | 52 |
| reservoir diameter | 54 |
| lip applicator removable cap | 56 |
| ramps | 58 |
| gap | 59 |
| Ramp height | 60 |

What is claimed is:

1. A lip applicator carrier system comprising:
   a) at least one lip applicator comprising a lip applicator housing, a lip applicator housing interior, and a dermatologically acceptable topical agent located in the lip applicator housing interior and configured to be used on a human's lips; and
   b) a carrier comprising a carrier housing comprising a top, a forward end, a rear end opposite the forward end, a left side, a right side opposite the left side, a substantially open bottom, at least one internal wall extending downward from the carrier housing top and defining a plurality of reservoirs, each of the plurality of reservoirs extending from the carrier housing forward end to the carrier housing rear end,
   wherein the carrier further comprises a clip extending above the carrier housing top,
   wherein the at least one lip applicator is removably located in a reservoir, and further wherein each reservoir comprises a top and further wherein at least one reservoir comprises a deflectable ramp extending from the top of the reservoir.

2. The lip applicator carrier system of claim 1 wherein the at least one internal wall comprises a bottom portion curving radially inward and further wherein the left side and right side of the housing comprise a bottom portion curving radially inward so that the plurality of reservoirs are generally c-shaped with a substantially open bottom.

3. The lip applicator carrier system of claim 1 wherein the plurality of reservoirs are generally c-shaped with a substantially open bottom and the at least one lip applicator is press fit into the reservoir.

4. The lip applicator carrier system of claim 1, wherein the forward end and rear end of the carrier housing are substantially open.

5. The lip applicator carrier system of claim 1 wherein the top of the carrier housing is generally flat.

6. The lip applicator carrier system of claim 1 wherein the clip comprises a deflectable free rear end not attached to the carrier housing and further wherein the deflectable free rear end is configured to move away from the top of the carrier housing to allow a visor of a vehicle to be placed between the deflectable free rear end and the top of the carrier housing.

7. The lip applicator carrier system of claim 1 wherein the clip comprises a generally c-shaped segment comprising a curve pointing generally in the forward direction.

8. The lip applicator carrier system of claim 7 wherein the generally c-shaped segment of the clip is located adjacent the forward end of the housing.

9. The lip applicator carrier system of claim 1, wherein the plurality of reservoirs are substantially the same size and have a diameter of from about 0.5 inches to about 0.75 inches.

10. The lip applicator carrier system of claim 1 wherein the lip applicator housing is generally cylindrical in shape.

11. The lip applicator carrier system of claim 1, wherein the dermatologically acceptable topical agent is lipstick.

12. The lip applicator carrier system of claim 1, wherein the dermatologically acceptable topical agent is lip balm.

13. The lip applicator carrier system of claim 1 and wherein the lip applicator further comprises a removable cap configured to prevent exposure of the dermatologically acceptable topical agent to the environment.

14. A method of loading a lip applicator carrier system comprising steps of:
  a) providing at least one lip applicator comprising a lip applicator housing, a lip applicator housing interior, and a dermatologically acceptable topical agent located in the lip applicator housing interior and configured to be used on a human's lips;
  b) providing a carrier comprising a carrier housing comprising a top, a forward end, a rear end opposite the forward end, a left side, a right side opposite the left side, a substantially open bottom, at least one internal wall extending downward from the carrier housing top and defining a plurality of reservoirs, each of the plurality of reservoirs extending from the carrier housing forward end to the carrier housing rear end, wherein the plurality of reservoirs are generally c-shaped with a substantially open bottom, wherein the carrier further comprises a clip extending above the carrier housing;
  c) press fitting at least one lip applicator into a reservoir; and
  d) attaching the clip to a substrate.

15. The method of claim 14, wherein the at least one internal wall comprises a bottom portion curving radially inward and further wherein the left side and right side of the housing comprise a bottom portion curving radially inward and step (c) comprises deflecting at least one of the bottom portions while press fitting the at least one lip applicator into the reservoir.

16. The method of claim 14 wherein the method further comprises removing the at least one lip applicator from the reservoir and applying the dermatologically acceptable topical agent to a human's lips.

17. A method of loading a lip applicator carrier system comprising steps of:
  a) providing at least one lip applicator comprising a lip applicator housing, a lip applicator housing interior, and a dermatologically acceptable topical agent located in the lip applicator housing interior and configured to be used on a human's lips;
  b) providing a carrier comprising a carrier housing comprising a top, a forward end, a rear end opposite the forward end, a left side, a right side opposite the left side, a substantially open bottom, at least one internal wall extending downward from the carrier housing top and defining a plurality of reservoirs, each of the plurality of reservoirs extending from the carrier housing forward end to the carrier housing rear end, wherein the carrier further comprises a clip extending above the carrier housing, wherein the clip comprises a deflectable free rear end not attached to the carrier housing, wherein the deflectable free rear end is configured to move away from the top of the carrier housing to allow a visor of a vehicle to be placed between the deflectable free rear end and the top of the carrier housing;
  c) loading the at least one lip applicator into a reservoir; and
  d) removably attaching the clip to a visor a vehicle by the positioning the visor between the deflectable rear end and the top of the carrier housing.

* * * * *